(12) United States Patent
Pantazi et al.

(10) Patent No.: US 11,222,255 B2
(45) Date of Patent: Jan. 11, 2022

(54) NEUROMORPHIC PROCESSING APPARATUS

(71) Applicant: SAMSUNG ELECTRONICS CO., LTD., Suwon-si (KR)

(72) Inventors: Angeliki Pantazi, Thalwil (CH);
Severin Sidler, Grosswangen (CH);
Stanislaw A. Wozniak, Adliswil (CH)

(73) Assignee: Samsung Electronics Co., Ltd., Suwon-si (KR)

( * ) Notice: Subject to any disclaimer, the term of this patent is extended or adjusted under 35 U.S.C. 154(b) by 927 days.

(21) Appl. No.: 15/680,140

(22) Filed: Aug. 17, 2017

(65) Prior Publication Data

US 2019/0057301 A1 Feb. 21, 2019

(51) Int. Cl.
| G06N 3/04 | (2006.01) |
| G06N 3/06 | (2006.01) |
| G06N 3/08 | (2006.01) |
| G06N 3/063 | (2006.01) |

(52) U.S. Cl.
CPC .......... *G06N 3/049* (2013.01); *G06N 3/0635* (2013.01); *G06N 3/082* (2013.01); *G06N 3/088* (2013.01)

(58) Field of Classification Search
CPC ....... G06N 3/049; G06N 3/0635; G06N 3/088
See application file for complete search history.

(56) References Cited

U.S. PATENT DOCUMENTS

| 8,812,414 B2 | 8/2014 | Arthur | |
| 9,195,934 B1 * | 11/2015 | Hunt | G06N 3/02 |
| 9,224,090 B2 * | 12/2015 | Piekniewski | G06N 3/088 |
| 9,465,985 B2 | 10/2016 | Xia et al. | |
| 2015/0106310 A1 | 4/2015 | Birdwell et al. | |

(Continued)

FOREIGN PATENT DOCUMENTS

| CN | 102346489 A | 2/2012 |
| WO | 2017003303 A1 | 1/2017 |

OTHER PUBLICATIONS

Angeliki Pantazi, "All-memristive neuromorphic computing with leveltuned neurons", 2016 (Year: 2016).*

(Continued)

*Primary Examiner* — Luis A Sitiriche
*Assistant Examiner* — Van C Mang
(74) *Attorney, Agent, or Firm* — NSIP Law (57) ABSTRACT

Neuromorphic processing apparatus is provided. The present invention may include a spiking neural network comprising a set of input spiking neurons each connected to each of a set of output spiking neurons via a respective synapse for storing a synaptic weight which is adjusted for that synapse in dependence on network operation in a learning mode of the apparatus, and each synapse is operable to provide a post-synaptic signal, dependent on its synaptic weight, to its respective output neuron. The present invention may further include a pre-processor unit adapted to process input data, defining a pattern of data points, to produce a first set of input spike signals which encode values representing respective data points, and a second set of input spike signals which encode values complementary to respective said values representing data points, and to supply the input spike signals to respective predetermined input neurons of the network.

19 Claims, 5 Drawing Sheets

(56) References Cited

U.S. PATENT DOCUMENTS

2016/0342904 A1    11/2016    Merkel et al.

OTHER PUBLICATIONS

Zhang, "A Neuromorphic Neural Spike Clustering Processor for Deep-Brain Sensing and Stimulation Systems", IEEE, 2015 (Year: 2015).*
Zhao, "Interspike-Interval-Based Analog SpikeTime-Dependent Encoder for Neuromorphic Processors", IEEE, 2017 (Year: 2017).*
Mitra_"Real-Time Classification of Complex Patterns Using Spike-Based Learning in Neuromorphic VLSI", IEEE, 2009 (Year: 2009).*
Abdullah, "Development of Cellular Neural Network Algorithm for Detecting Lung Cancer Symptoms", IEEE, 2010 (Year: 2010).*
Sultana, "Design and Development of FPGA based Adaptive Thresholder for Image Processing Applications", IEEE, 2011 (Year: 2011).*
Examination Report of European Application No. GB2003180.3 dated Apr. 16, 2020.
Kim, H. et al. Neural Synaptic Weighting with a Pulse-Based Memristor Circuit IEEE Transactions on Circuits and Systems I: Regular Papers Jan. 31, 2012 No. 1 vol. 59 pp. 148-158.
Al-Shedivat et al., "Inherently Stochastic Spiking Neurons for Probabilistic Neural Computation," 7th Annual International IEEE EMBS Conference on Neural Engineering, Apr. 22-24, 2015, p. 356-359, IEEE, Montpellier, France.
Ambrogio et al., "Unsupervised Learning by Spike Timing Dependent Plasticity in Phase Change Memory (PCM) Synapses," Frontiers in Neuroscience, Mar. 8, 2016, p. 1-12, vol. 10 Article 56.
Burr et al., "Experimental Demonstration and Tolerancing of a Large-Scale Neural Network (165,000 Synapses), Using Phase-Change Memory as the Synaptic Weight Element," 2014 IEEE International Electron Devices Meeting (IEDM), Dec. 15-17, 2014, p. 697-700.
Cohen et al., "Skimming Digits: Neuromorphic Classification of Spike-Encoded Images," Frontiers in Neuroscience, Apr. 28, 2016, p. 1-11, vol. 10, Article 184.
Diehl et al., "Unsupervised Learning of Digit Recognition Using Spike-Timing-Dependent Plasticity," Frontiers in Neuroscience, Aug. 3, 2015, p. 1-9, vol. 9, Article 99.
Földiák, "Forming Sparse Representations by Local Anti-Hebbian Learning," Biological Cybernetics, Dec. 1990, p. 165-170, vol. 64, Issue 2, Springer-Verlag.
Kuzum et al., "Nanoelectronic Programmable Synapses Based on Phase Change Materials for Brain-Inspired Computing," Nano Letters, 2012, 8 Pages, vol. 12, Issue 5, ACS Publications, American Chemical Society.
Kuzum et al., "Synaptic Electronics: Materials, Devices and Applications," Nanotechnology, Sep. 2, 2013, p. 1-22, vol. 24, No. 38, IOP Publishing Ltd.
Modha et al., "Cognitive Computing," Communications of the ACM Contributed Articles, Aug. 2011, p. 62- 71, vol. 54, No. 8.
Pantazi et al., "All-Memristive Neuromorphic Computing with Level-Tuned Neurons," Nanotechnology, Jul. 26, 2016, p. 1-13, vol. 27, No. 35, IOP Publishing Ltd.
Querlioz et al., "Simulation of a Memristor-Based Spiking Neural Network Immune to Device Variations," Proceedings of International Joint Conference on Neural Networks, Jul. 31-Aug. 5, 2011, p. 1775-1781, IEEE, San Jose, California, USA.
Woźniak et al., "Learning Spatio-Temporal Patterns in the Presence of Input Noise using Phase-Change Memristors," IEEE International Symposium on Circuits and Systems (ISCAS), May 22-25, 2016, p. 365-368.
Wu et al., "Homogeneous Spiking Neuromorphic System for Real-World Pattern Recognition," IEEE Journal on Emerging and Selected Topics in Circuits and Systems, Jun. 2015, p. 254-266, vol. 5, No. 2.

* cited by examiner

NEUROMORPHIC PROCESSING APPARATUS

BACKGROUND

The present invention relates generally to neuromorphic processing apparatus, and more particularly to such apparatus employing spiking neural networks.

Neuromorphic technology relates to computing systems which are inspired by biological architectures of the nervous system. Conventional computing architectures are becoming increasingly inadequate to meet the ever-expanding processing demands placed on modern computer systems. The rise of Big Data, for example, demands high-speed processing of ever-increasing volumes of diverse information. Compared to the human brain, the classical von Neumann computer architecture is highly inefficient in terms of power consumption and space requirements. The human brain occupies less than 2 liters and consumes around 20 W of power. Simulating 5 seconds of brain activity using state-of-the-art supercomputers takes around 500 s and needs 1.4 MW of power. These issues have prompted a significant research effort to understand the highly efficient computational paradigm of the human brain and to create artificial cognitive systems with unprecedented computing power.

Neurons and synapses are two basic computational units in the brain. A neuron can integrate input signals, e.g. from other neurons or sensory receptors, and generates output signals ("action potentials", or "spikes"). An output spike is relayed to other neurons via synapses. A synapse is connected between an input, pre-synaptic neuron and an output, post-synaptic neuron. The synapse receives spikes from its input neuron and provides post-synaptic signals ("post-synaptic potentials"), to its output neuron. A post-synaptic signal is a graded synaptic potential which depends on conductance (also known as "synaptic efficacy" or "weight") of the synapse. Synaptic weight can be enhanced or reduced by neuronal activity, and this "plasticity" of synapses is crucial to memory and other brain functions. For example, synaptic weight may be modified in response to arrival of neuron spikes, and changes in weight may depend on various aspects of neural network operation such as timing or relative timing of input and/or output neuron spikes.

Neuromorphic processing architectures are typically based on implementations of spiking neural networks (SNNs) in which computation relies on all-or none spike-based communication between a network of spiking neurons. The basic components of an SNN comprise circuitry emulating neurons and synapses, with the neurons being interconnected by synapses which can relay spikes between their input and output neurons in dependence on a stored synaptic weight. Various neuron and synapse implementations are known, with neurons emulating the "integrate-and-fire" functionality of biological neurons and synapses emulating the plasticity of biological synapses. For example, nanoscale synapses can be realized using memristive properties of nanodevices, e.g. resistive memory cells such as phase-change memory (PCM) cells. Dense cross-bar arrays of such memristive devices offer massively parallel and highly area- and energy-efficient implementations as the dynamics and plasticity of these memristive synapses are used to realize both the memory and the distributed computing function of these systems.

It has been shown that SNNs can perform correlation detection tasks whereby the network can detect correlations between input data streams. Recent demonstrations of correlation detection primitives using synapses based on PCM devices have shown good performance (see e.g. "Learning Spatio-Temporal Patterns in the Presence of Input Noise using Phase-Change Memristors", Woźniak et al., ISCAS 2016, IEEE (2016) pp. 365-368). Correlation detection provides the basis for more complex cognitive tasks such as pattern recognition/classification Enhancing accuracy of SNN operation is of great importance for such tasks.

Unsupervised learning approaches for classification tasks have been studied for spiking neural network architectures. These approaches yield diminishing accuracy improvements with an increasing number of neurons. Use of memristive devices in hardware implementations further reduces accuracy due to inherent properties of these devices, such as device variability, noise and imperfections. Resistive memory cells such as PCM cells also exhibit an asymmetric conductance response, whereby the process of reducing the cell resistance differs from that for increasing cell resistance. In synapse implementations using such devices, where synaptic weight is dependent on cell resistance, this asymmetric conductance response further affects accuracy. Such effects are particularly apparent in complicated cognitive tasks such as MNIST (Modified National Institute of Standards and Technology) classification of handwritten digits. Attempts to address these issues include synapses based on a single PCM cell with an asymmetric STDP (Spike Timing Dependent Plasticity) rule for updating synaptic weight, and synapses based on more than one cell, such as a differential configuration of two PCM cells. However, the abrupt cell reset required in the single-cell approach becomes critical for complex tasks. Multi-cell approaches increase complexity. The asymmetric conductance response may still be a problem in these approaches, and the differential configuration requires cyclic rebalancing of synapses to prevent cell saturation.

SUMMARY

According to at least one embodiment of the present invention there is provided neuromorphic processing apparatus. The processing apparatus includes a spiking neural network comprising a set of input spiking neurons each connected to each of a set of output spiking neurons via a respective synapse for storing a synaptic weight which is adjusted for that synapse in dependence on network operation in a learning mode of the apparatus. Each synapse is operable, in response to receipt of a spike from its respective input neuron, to provide a post-synaptic signal, dependent on its synaptic weight, to its respective output neuron. The apparatus further comprises a preprocessor unit adapted to process input data, defining a pattern of data points, to produce a first set of input spike signals which encode values representing respective data points, and a second set of input spike signals which encode values complementary to respective said values representing data points, and to supply the input spike signals to respective predetermined input neurons of the network.

In apparatus embodying the invention, the preprocessor unit provides two sets of input signals to the SNN, one encoding the pattern of data points to be processed, and the other encoding a complementary pattern. This offers significant advantages leading to improved SNN performance. The synapses store information on both the original and complementary patterns, increasing sensibility for correlation detection. Information on the absence of an input at a certain point is also considered in the network, offering improved performance in problematic cases of distinguishing partially overlapping patterns, e.g. handwritten digits 4 and 9, or 1 and 7. Moreover, the complementary input information provides improved performance for the asymmetric response of resistive memory synapses such as PCM synapses. These and other advantages will be explained in more detail below.

The synaptic weights are adjusted by training the network for a particular task in a learning mode of the apparatus. Application-specific processing apparatus may be provided post-learning, i.e. with the SNN already trained for a particular task. Alternative embodiments may be adaptable, through training, to a desired task. Hence, embodiments of the apparatus may be operable in both the learning mode and an application mode. In the learning mode, the preprocessor unit is operable to process at least one set of training data, defining a training pattern of data points, to produce the first and second sets of input spike signals for the training pattern, and to supply the input spike signals to respective input neurons of the network in accordance with a predetermined mapping. In this learning mode, the network is adapted such that the synaptic weights of respective synapses are adjusted in dependence on network operation in response to the input spike signals for the training pattern(s). Post-learning, in the application mode, the preprocessor unit is operable to process application data, defining an application pattern of data points, to produce the first and second sets of input spike signals for the application pattern, and to supply the input spike signals to respective input neurons of the network in accordance with the predetermined mapping used in the learning mode. In this mode, the network is adapted such that the synaptic weights of the synapses remain as adjusted in the learning mode, i.e. the weights are not further updated in response to the input spike signals for the application pattern.

After training, spikes produced by the output neurons in response to an input pattern provide information about that input pattern in relation to pattern(s) processed in the learning mode and used to train the network via adjustment of synaptic weights. The output neuron spikes may be processed in various ways depending on implementation of the apparatus and the particular application. In some embodiments, for example, the SNN may form part of a more complex network involving multiple sub-networks. The output neuron spikes may then provide information on particular features or aspects of a pattern, and this information may be further processed in the larger network. Other embodiments may include a postprocessor unit connected to the output neurons of the network. The postprocessor unit may be adapted to classify the input pattern in dependence on spikes produced by the output neurons in response to the input spike signals for the pattern. The nature of the classification operation here will depend on the application task.

The preprocessor unit may be adapted such that the second set of input spike signals comprises signals encoding complementary values for all of the data points, whereby the input signals encode a complementary pattern corresponding to the entire original pattern. This offers maximum information for correlation detection operations. In other embodiments, the second set of input spike signals may comprise signals encoding complementary values for only a subset of the data points, such as a predetermined subset, or a subset which is dependent on the original pattern. For example, the preprocessor unit may be adapted to identify active data points from the input data, and to produce the second set of input spike signals to comprise signals encoding complementary values for data points in a portion of the pattern containing the active data points. Such embodiments, explained further below, offer improved power consumption and more balanced spike contribution of the original and complementary patterns.

The apparatus embodying the invention offers improved performance regardless of the particular synapse technology. However, preferred embodiments employ memristive synapses based on resistive memory cells, e.g. PCM cells. Efficient networks of such cells can be exploited, while mitigating problems associated with prior SNNs based on these cells.

Embodiments of the invention will be described in more detail below, by way of illustrative and non-limiting example, with reference to the accompanying drawings.

DETAILED DESCRIPTION

Detailed embodiments of the claimed structures and apparatuses are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Figure 1:
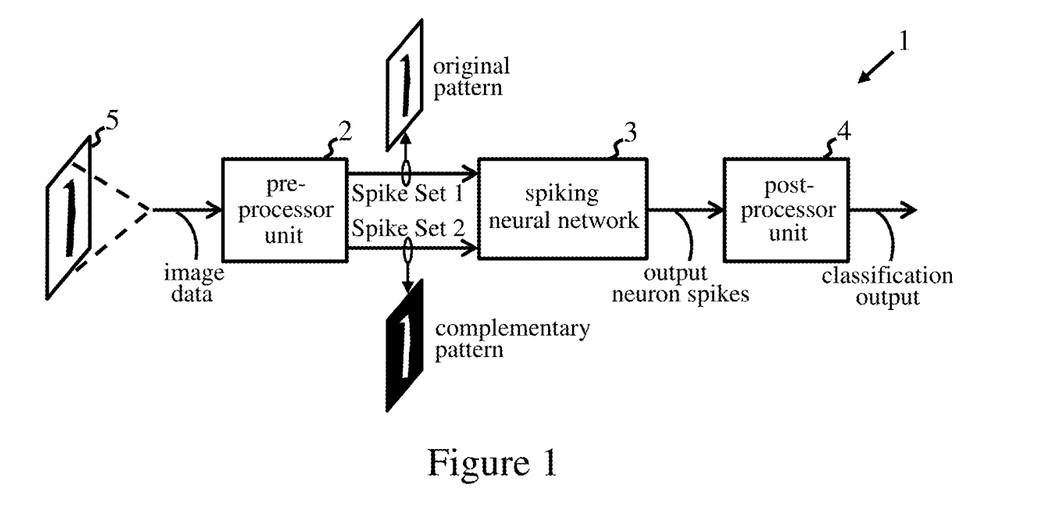
FIG. 1 is a schematic representation of a neuromorphic processing apparatus embodying the invention.

FIG. 1 is a schematic block diagram showing basic structure of neuromorphic processing apparatus 1 embodying the invention. In this example, the apparatus 1 is used in an image classification application. The apparatus 1 comprises a preprocessor unit 2, an SNN 3, and a postprocessor unit 4. Preprocessor unit 2 is adapted to process input data defining a pattern of data points. In this application, the pattern of data points comprises a greyscale image 5 which is acquired by an input device such as a camera, scanner, etc., (not shown). The resulting image data, comprising data corresponding to respective pixels of the image, is supplied as the input data to preprocessor unit 2. The preprocessor unit is adapted to process this input data to produce two sets of input spike signals, denoted by Spike Set 1 and Spike Set 2, for SNN 3. The input spike signals of Set 1 encode values representing respective data points of the pattern to be analyzed, here pixels of image 5. Hence, for each pixel of the image, the data value for that pixel is encoded as an input spike signal in Set 1. The input spike signals of Set 2 encode values which are complementary to respective values representing data points. Hence, each input spike signal of Set 2 encodes a value which is complementary to the data value for an image pixel. In this example, the preprocessor unit produces a Set 2 spike signal corresponding to each pixel of the image, whereby Set 2 comprises signals encoding complementary values for all data points. The input spike signals of both sets are supplied as inputs to SNN 3.

Figure 2:
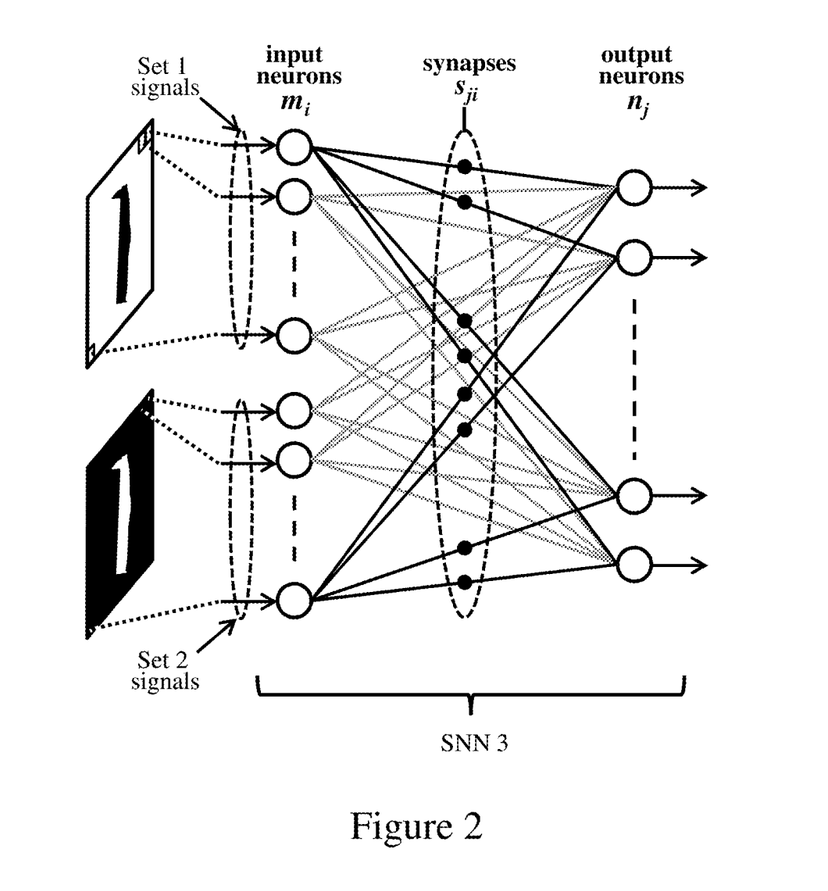
FIG. 2 indicates basic structure of an SNN of the FIG. 1 processing apparatus.

The structure of SNN 3 is indicated schematically in FIG. 2. SNN 3 comprises a set of M input spiking neurons and a set of N output spiking neurons, where N is typically less than M. Each input neuron, denoted by $m_i$, (i=1 to M), is connected to each output neuron, denoted by $n_j$ (j=1 to N), by a respective synapse $s_{ji}$. As explained further below, each synapse $s_{ji}$ stores a synaptic weight $W_{ji}$ and is operable, in response to receipt of a spike from its respective input neuron $m_i$, to provide a post-synaptic signal (also referred to in the art as a "post-synaptic potential"), dependent on its weight $W_{ji}$, to its respective output neuron $n_1$.

As indicated schematically in FIG. 2, preprocessor unit 2 supplies the input spike signals of both Set 1 and Set 2 to respective predetermined input neurons $m_i$, of SNN 3. The signals are supplied to individual input neurons in accordance with a predetermined mapping which defines, for each of the first and second sets of input signals, which input neuron $m_i$ receives the input signal corresponding to a given data point, here pixel, of the input pattern. This mapping is determined for a learning mode of the apparatus, discussed below, and can be arbitrarily defined but remains consistent in operation of the apparatus. The physical layout of neurons and synapses in SNN 3 is also arbitrary, being a matter of design choice. In a typical SNN, however, synapses $s_{ji}$ may be laid out in a cross-bar array comprising rows and columns, with synapses in a given column receiving spikes from a corresponding input neuron $m_i$, and synapses in a given row providing post-synaptic signals to a corresponding output neuron $n_j$.

Figure 3:
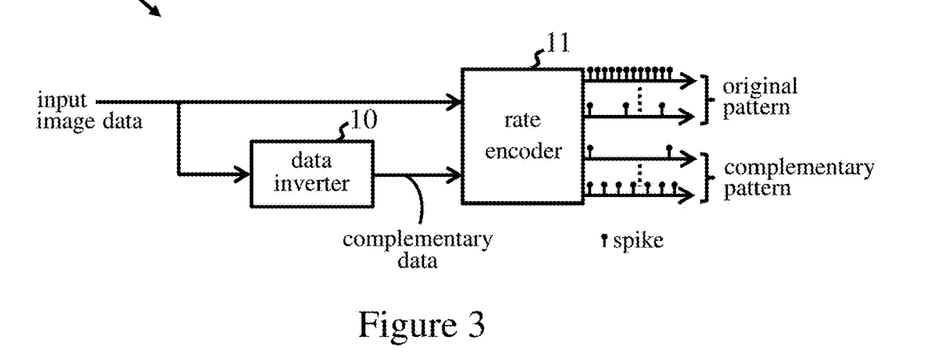
FIG. 3 illustrates one embodiment of a preprocessor unit of the processing apparatus.

The preprocessor unit 2 of this embodiment is adapted to produce the input spike signals of Set 1 by encoding the input data corresponding to respective data points via a predetermined encoding scheme, and to produce the input spike signals of Set 2 by: (a) producing data complementary to the input data corresponding to respective data points; and (b) encoding the complementary data via the same encoding scheme. FIG. 3 is a schematic representation of the structure of preprocessor 2. The preprocessor comprises a data inverter 10 and a rate encoder 11. Data inverter 10 receives the input image data and produces complementary pixel data for each pixel of the image. The complementary pixel data defines a value which is complementary to that of the pixel data for the corresponding pixel. For example, if pixels from dark to light on the greyscale are represented by values ranging from 0 to x, pixel data of value 0≤p≤x for a pixel of the original image can be inverted to produce complementary pixel data of value p'=(x−p). The complementary image data thus represents a negative of the original image. The complementary image data is supplied by data inverter 10 to rate encoder 11 which also receives the original input image data. Rate encoder 11 rate-encodes each pixel and complementary pixel of the original and complementary image data to produce a spike signal comprising a train of spikes in which the spike rate is dependent on the data value for that pixel/complementary pixel. The spike signals produced from the original image data form the input spike signals of Set 1. The spike signals produced from the complementary image data form the input spike signals of Set 2. The resulting rate-encoded spike signals are output to SNN 3.

In operation of SNN 3, spiking neurons $m_i$, $n_j$ integrate their input signals and fire, producing an output spike, when the accumulated input value (as represented by a so-called "membrane potential" of the neuron) exceeds a firing threshold for the neuron. Each input neuron $m_i$ thus produces spikes in dependence on the input spike signals received by that neuron. Spikes generated by an input neuron $m_i$ are received by its connected synapses $s_{ji}$ which output post-synaptic signals to their respective output neurons $n_j$. Each output neuron $n_j$ may similarly produce output spikes in dependence on signals received from its synapses $s_{ji}$. In this embodiment, the output neurons $n_j$ of SNN 3 are connected to postprocessor unit 4 which receives the output neuron spikes. Postprocessor unit 4 is adapted to classify the original input pattern of data points, here image 5, in dependence on the output neuron spikes generated in response to the input spike signals to SNN 3. In particular, based on the output neuron spikes, postprocessor 4 detects correlation between the input image pattern and one or more training patterns previously "learnt" by SNN 3 in a learning mode described further below. The postprocessor classifies the input image based on the correlation detection operation, e.g. identifies the image as depicting a particular item such as a handwritten digit, to provide a classification output for the image. In general, the process of classifying an input pattern in postprocessor 4 will depend on the particular application task and the training pattern(s) learnt in the learning mode. Classification may, for example, involve identifying the input pattern as being a particular pattern or type of pattern, identifying the pattern as similar/dissimilar to a training pattern, or otherwise indicating a degree of correlation with one or more training patterns.

The functionality of preprocessor 2 and postprocessor 4 as described herein can be implemented in generally known manner via hardware or software or a combination thereof. A variety of known circuit implementations may be employed for the neurons and synapses of SNN 3. In general, however, neurons $m_i$, $n_j$ and synapses $s_{ji}$ can be implemented in any desired manner, and particular functionality may be provided by hardware/software or a combination thereof. The operation of synapses $s_{ji}$, which provide the basis for the learning and correlation detection operations of apparatus 1, is described in more detail below.

Figure 4:
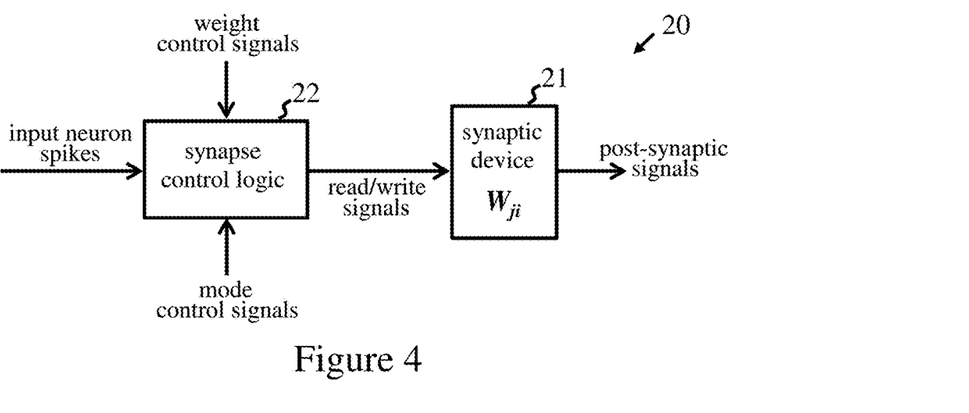
FIG. 4 is a schematic representation of a synapse in the FIG. 2 SNN.

FIG. 4 illustrates basic structure of synapse apparatus 20 for implementing synapses $s_{ji}$. The synapse 20 comprises a synaptic device 21 and synapse control logic 22. Synaptic device 21 stores the synaptic weight $W_{ji}$ and may be implemented, for example, by a memristive device such as a resistive memory cell whereby synaptic weight $W_{ji}$ depends inversely on device resistance R, e.g. $W_{ji}=R^{-1}$. Control logic 22 receives the input neuron spikes and controls operation of synaptic device 21. In particular, control logic 22 controls "read" and "write" operations of synaptic device 21. A read operation is performed in response to receipt of an input neuron spike and produces a post-synaptic signal, dependent on the synaptic weight $W_{ji}$, at the output of synaptic device 21. This can be achieved in known manner by applying a read signal, e.g. a current or voltage pulse, to synaptic device 21 whereby the resulting output signal depends on the stored weight $W_{ji}$, as determined by device resistance R for example. A write operation is performed to adjust the weight $W_{ji}$ in order to implement synaptic plasticity. A write operation, and the amount $\Delta W_{ji}$ by which the weight $W_{ji}$ is updated, is controlled by control logic 22 in dependence on weight control signals received by the control logic in operation of SNN 3. The weight control signals indicate the events prompting a write operation and the events or other variables on which the update amount $\Delta W_{ji}$ depends. These events/variables may depend on various aspects of network operation and can be selected in various ways to provide desired synaptic dynamics. For example, a write operation may be prompted in response to spiking of the input and/or output neuron, and the weight update $\Delta W_{ji}$ may depend on absolute or relative timing of neuron spikes, rate of neuron spikes, or other aspects of network activity e.g. properties of input and/or output neurons such as the aforementioned membrane potential which determines when a neuron fires. A write operation can be performed in known manner by applying a write signal, e.g. a current/voltage pulse or series of pulses, to synaptic device 21 to update the stored weight $W_{ji}$ by the desired amount, e.g. by changing the device resistance R.

Control logic 22 also receives mode control signals which control the operating mode of synapses $s_{ji}$ in SNN 3. In particular, processing apparatus 1 is operable in a learning mode, in which SNN 3 is trained and synaptic weights $W_{ji}$ are adjusted by write operations, and in an application mode in which synaptic weights $W_{ji}$ are not adjusted and only read operations are performed. Synaptic weights $W_{ji}$ are thus adjusted for the synapses in dependence on network operation in the learning mode, and the stored weights after learning remain unchanged for the application mode. The mode control signals may be generated globally by a network controller (not shown) which controls SNN operation generally, and may also generate global supply voltages for read/write operations.

Figure 5:
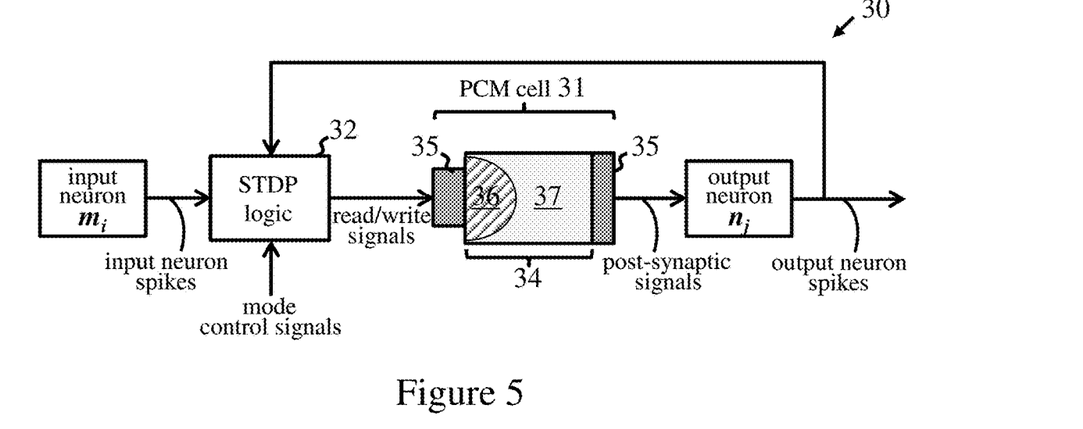
FIG. 5 shows a more detailed embodiment of the FIG. 4 synapse.
Figure 6:
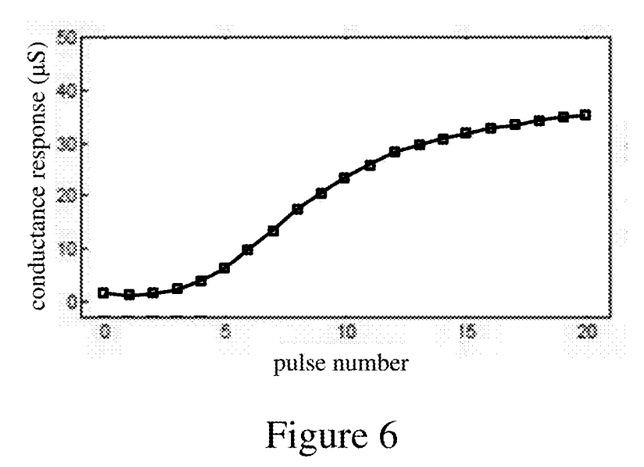
FIG. 6 illustrates the conductance response of a PCM cell.

The synaptic devices 21 of synapses $s_{ji}$ are preferably implemented using PCM cells. FIG. 5 shows an exemplary implementation of such a synapse. The synapse 30 is shown connected between its input and output neurons in $m_i$, $n_j$. The synaptic device comprises a single PCM cell 31 here. Read and write operations of PCM cell 31 are controlled by STDP (Spike Timing Dependent Plasticity) logic 32 which receives spikes from both input neuron $m_i$ and output neuron $n_j$. Operation of PCM cell 31 exploits the variable-resistance characteristics of a volume of PCM material 34, e.g. a chalcogenide such as GST (Germanium-Antimony-Tellurium), which is disposed between a pair of electrodes 35. The synaptic weight $W_{ji}$ is stored in the phase configuration of the cell and is altered by application of current pulses. PCM materials exhibit a large difference in resistivity between amorphous (high-resistivity) and crystalline (low-resistivity) phases. The transition from the amorphous phase to the crystalline phase is realized through the application of crystallizing pulses to the electrodes. These pulses heat the material above the crystallization temperature and gradually alter the device conductance, here by reducing the size of a high-resistance amorphous dome 36 within the remaining low-resistance crystalline material 37. FIG. 6 shows the conductance response of such a PCM cell 31 after consecutive application of crystallizing pulses. This gradual characteristic allows the synaptic weight $W_{ji}$ to be incrementally adjusted, providing incremental learning capability in synapse 30. The amorphous region of the cell can be restored by applying a reset pulse to melt the PCM material, restoring the amorphous phase on cooling.

STDP logic 32 adjusts the synaptic weight $W_{ji}$ of synapse 30 in the learning mode, via write operations to PCM cell 31, in dependence on relative timing of spikes produced by the input and output neurons $m_i$, $n_j$ of the synapse. Various STDP rules (defining how the weight update $\Delta W_{ji}$ depends on time difference $\Delta t$ between input and output neuron spikes) may be implemented here, and a particular example is detailed below. STDP logic 32 also controls read operations, for generation of post-synaptic signals in both learning and application modes, by applying a low-voltage read pulse to the cell electrodes. The read voltage level is low enough to ensure that the read voltage does not disturb the programmed cell-state. The resulting current pulse through the cell, which depends on cell resistance and hence synaptic weight $W_{ji}$, provides the post-synaptic signal to output neuron $n_j$.

In the learning mode of apparatus 1, the SNN 3 is trained by processing at least one set of training data, each defining a training pattern of data points, on which classification is to be based in the application mode. For the image classification example here, a training pattern comprises an image. For each training image, the preprocessor unit operates as described above, producing the first and second sets of input spike signals for the training image. These input spike signals are supplied to respective input neurons $m_i$ of the network in accordance with a predetermined mapping as described earlier. The mode control signal for SNN 3 sets all synapses $s_{ji}$ to the learning mode. The synaptic weights $W_{ji}$ of respective synapses are thus adjusted in dependence on SNN operation in response to the input spike signals for each training image.

The spikes generated by output neurons $n_j$ in response to each training image are detected by postprocessor 4. Particular spike patterns are associated with each training image such that correlation can be detected later between the spike patterns for training images and spike patterns generated for input images in the application mode. This association operation may be performed in various ways depending on particulars of the application, and may involve further processing of output spike patterns. A particular example of this procedure is detailed below.

After training, in the application mode, the apparatus can be operated to process application data, defining an application pattern of data points, to detect correlation between the application pattern and patterns learnt by SNN 3 in the learning mode. In this mode, for an application pattern comprising an image, the image is processed as before by preprocessor 2 to produce the first and second sets of input spike signals for the image. These input spike signals are supplied to respective input neurons $m_i$ of the network in accordance with the predetermined mapping defined for the learning mode. The mode control signal for SNN 3 sets all synapses $s_{ji}$ to the application mode. In this mode, the SNN 3 is thus adapted such that the synaptic weights $W_{ji}$ of the synapses remain as adjusted in the learning mode, i.e. no write operations are performed and the weights are not further updated in response to the application pattern. Spikes generated by the output neurons $n_j$ in response to the application image are detected by postprocessor 4 and used to classify the application image as described above.

The use of inputs from both original and complementary patterns provides significant improvements in SNN operation, and mitigates problems associated with use of resistive memory cell synapses in prior systems. Improved operation is demonstrated even for complex classification tasks such as MNIST classification. The various advantages are illustrated by classification results obtained with an implementation of the above embodiment detailed further below.

Figure 7:
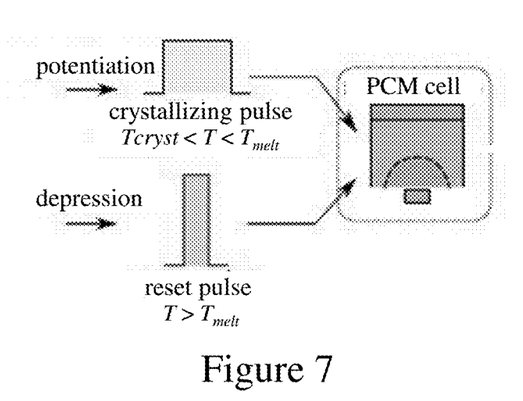
FIGS. 7 and 8 illustrate operation of FIG. 5 synapses in the SNN of FIG. 2.
Figure 8:
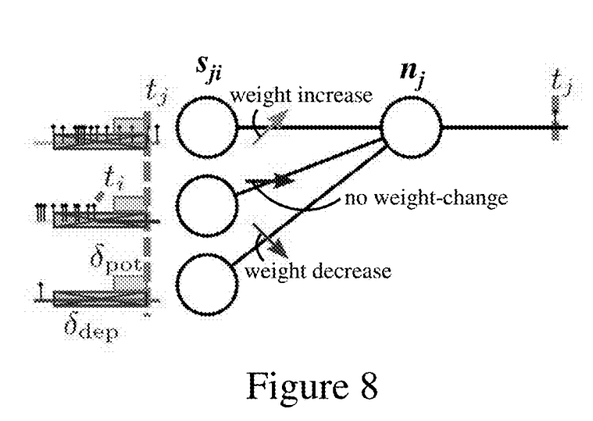

The implementation tested used a processing apparatus architecture generally as described above. A single PCM cell synaptic device was employed as described for FIG. 5, with an asymmetric STDP rule to address the abrupt reset. FIGS. 7 and 8 illustrate the concept in more detail. FIG. 7 indicates operation of the PCM synaptic device (described in more detail in the Woźniak paper referenced earlier). A crystallization pulse is used for synaptic potentiation (increase in synaptic weight $W_{ji}$). These pulses heat the material above the crystallization temperature $T_{cryst}$ and incrementally alter the device conductance. A reset pulse is used to reamorphize the PCM material at each synaptic depression event (decrease in synaptic weight $W_{ji}$). The reset pulse is a higher amplitude current pulse which heats the PCM material above its melting temperature $T_{melt}$. The abrupt cutoff of the pulse causes the molten material to quench back to the amorphous phase. The abrupt reset effectively causes the synapse to instantly "forget" information previously learned through adjustment of $W_{ji}$.

FIG. 8 illustrates the STDP learning mechanism. This is a modified version of the scheme presented in "Simulation of a memristor-based spiking neural network immune to device variations", Querlioz et al., Neural Networks, IJCNN 2011, IEEE (2011), pp. 1775-1781. Two time windows are defined, $\delta_{pot}$ and $\delta_{dep}$, as shown in the FIG. When an output neuron spikes at a time instant $t_j$, the corresponding synaptic weights $W_{ji}$ are modified depending on the time $t_i$ of their last input spike. If $t_j-t_i<\delta_{pot}$, the synaptic weight $W_{ji}$ is potentiated. If $t_j-t_i>\delta_{dep}$, the synapse is depressed. In all other cases, the synaptic weight remains unchanged. The introduction of two windows in the learning mechanism here aims to reduce the number of the applied reset pulses.

The classification task used the MNIST dataset of handwritten digits 0 to 9. The task of the network is to recognize which digit is represented in the input and to classify it into one of the ten classes. The input patterns consist of 28-by-28 pixel grayscale images which were processed in preprocessor 2 using a rate-encoding scheme. Specifically, the pixel intensity was linearly mapped to a spiking frequency from 0 Hz (lowest intensity) to 20 Hz (highest intensity). These frequencies were used as mean frequencies in random Poisson processes to generate the input spike signals. The SNN architecture consisted of 2×28×28=1568 input neurons $m_i$ and 50 output neurons $n_j$ implementing the leaky integrate-and-fire (LIF) model. To introduce competition between the output neurons, a WTA (Winner-Takes-All) mechanism based on lateral inhibition was applied. (Such mechanisms are well known in the art, and select one "winning" output neuron $n_j$ among all that cross the firing threshold. The selection is based on the difference between the respective membrane potential and the firing threshold.) To ensure that all neurons participated in learning, the threshold voltages were adapted to their respective stimuli using homeostasis, similarly to the mechanism described in the Querlioz reference above. (Homeostasis is again well known in the art, and involves adjusting the neuron firing thresholds based on their activity to ensure that neurons maintain a similar level of activity in the long term. Firing thresholds are thus set to higher levels if neurons are more active (emit more output spikes relative to other neurons) and lower levels if neurons are less active (emit less output spikes relative to other neurons)).

For the learning mode, the samples from the MNIST training set were used as input patterns. The synaptic weights were updated according to the learning mechanism and the thresholds were adjusted following the homeostasis rule. Postprocessor 4 first clustered the input patterns in an unsupervised way (i.e. without labels indicative of class) based on the similarity of appearance as indicated by the output spikes, with every output neuron representing one cluster. In a second step, using the classification labels for the training patterns, each cluster and hence output neuron was assigned to one of the ten classes. To assign a class to every output neuron, the last 10000 patterns from the training set were used. The network was operated with both deactivated learning mechanism (no synaptic weight adjustment) and homeostasis. Based on the number of firing events, postprocessor 4 assigned every output neuron to the class for which it spiked the most.

Figure 9A:
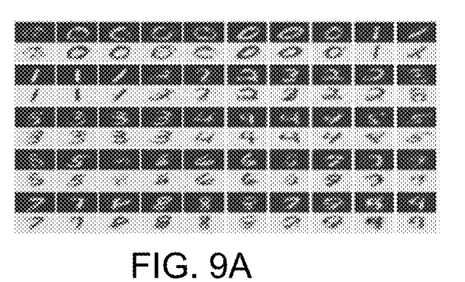
FIGS. 9A to 9D illustrate simulation results for apparatus embodying the invention and comparable systems.
Figure 9B:
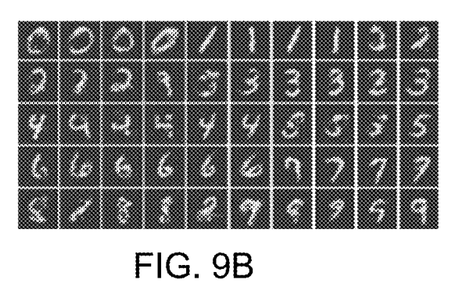
Figure 9C:
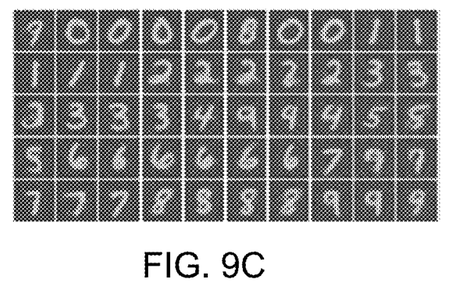
Figure 9D:
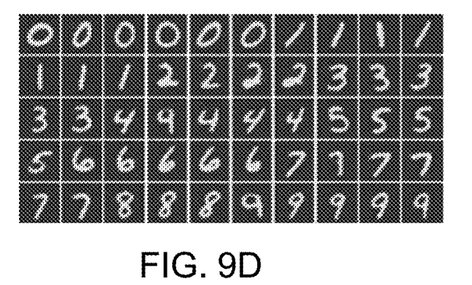

For the application mode, the test set from the MNIST database was used. Every test pattern was classified to the class for which the corresponding output neurons produced the most output spikes. The classification accuracy was then calculated. Simulation results for the above implementation achieved a test set classification accuracy of 68.61%. FIG. 9A shows image representations of the final synaptic weights post-learning. This result was compared with equivalent implementations of prior systems using no complementary pattern, and hence half the number of input neurons and synapses, and the same number of output neurons. With the single PCM synapse of the Woźniak reference above, the test accuracy was 55.55% and the final synaptic weights are shown in FIG. 9B. With a synaptic device having two PCM cells in the differential configuration (as detailed in "Experimental demonstration and tolerancing of a large-scale neural network (165,000 synapses), using phase-change memory as the synaptic weight element", Burr et al., 2014 IEEE International Electron Devices Meeting, IEEE (2014) 29.5.1-29.5.4), the test accuracy was 73.73% and the weights are shown in FIG. 9C. Finally, simulation with ideal synaptic weights (linear, bidirectional weights with an asymmetry between potentiation and depression) gave a test accuracy of 77.7% with synaptic weights as shown in FIG. 9D.

Compared to the ideal synaptic weights, the drop-in accuracy for the Woźniak SNN with single-PCM synapses is attributed to the abrupt depression characteristic of the synapses. By comparison, the complementary pattern implementation provided an increase in accuracy of approximately 13%. The abrupt reset problem is mitigated with the complementary pattern approach because two devices are used to represent the information of each data point: one stores the original input data and the other its complement. If one synapse is reset, and the information "forgotten", information on that data point is still stored by the other synapse. While the number of input neurons and synapses is doubled, the number of output neurons, and their mode of operation in the SNN architecture, remains the same.

Performance of the complementary pattern implementation is comparable to that of the differential two-PCM configuration, with only a small reduction in accuracy. The number of synaptic devices is the same in both implementations, but the complementary pattern implementation is significantly less complex. The differential configuration needs two crossbar arrays for the synaptic devices, and subtraction of the positive and negative weight contributions of the two cells in each synapse. This configuration also requires cyclic conductance rebalancing for synaptic operation, whereby weights of the cells are continuously read and rebalanced to avoid saturation. In contrast, the complementary pattern approach requires only one crossbar array, and does not add complexity to SNN operation. The working principle of the network remains the same as the prior single cell approach since all additional functionality is provided by the preprocessor operation.

It is an inherent characteristic of prior SNNs that only the active information is used because the input patterns are presented in the form of spikes that carry a single bit of information. In consequence, inactive data points (e.g. dark pixels) are not distinguished from the absence of input. In contrast, use of the complementary pattern approach described above ensures that information on the absence of input at a certain location is also considered in the network. This is especially beneficial for improving the performance for cases with high overlap between input patterns e.g. handwritten digits 1 and 7, since the complementary information allows the areas of difference in the patterns to be better distinguished. The additional information from the complementary pattern provides increased sensibility in the network, leading to less false neuronal spiking.

Figure 10A:
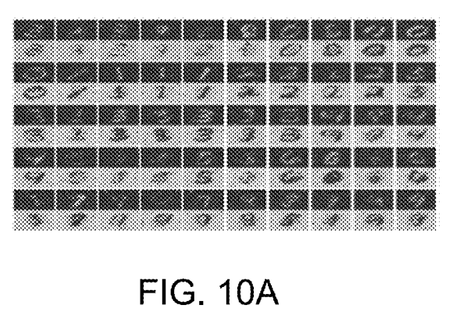
FIGS. 10A and 10B illustrate experimental results obtained with an embodiment of the invention and a comparable prior system.
Figure 10B:
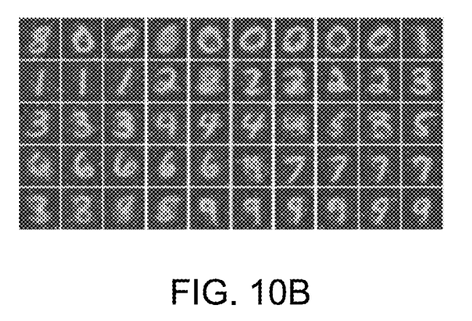

The differential two-PCM synapse configuration and the complementary pattern approach with a single-PCM synapse were further compared experimentally by realizing the two network configurations. The basic hardware platform was that described in "All-memristive neuromorphic computing with level-tuned neurons", Pantazi et al., Nanotechnology 27(35) (2016) 355205, and used a prototype phase-change chip fabricated in 90 nm CMOS technology. The PCM devices were of mushroom-type with doped $Ge_2Sb_2Te_5$ phase-change material. The PCM devices implemented the synapses of the SNN in hardware whereas the learning mechanism and LIF neurons were emulated in software. The experimental weights for the complementary-pattern, single-PCM device approach are shown in FIG. 10A, and those for the differential synapse approach in FIG. 10B. The MNIST test set accuracy for the differential synapse was 68.14%. The reduction in accuracy compared to the simulation is due to variability and imperfections of the PCM devices, but performance is good considering the small size of the network. The complementary pattern approach achieved an accuracy of 59.20%. Given the simplicity of the scheme, this performance in the MNIST classification task is remarkably good.

Figure 11:
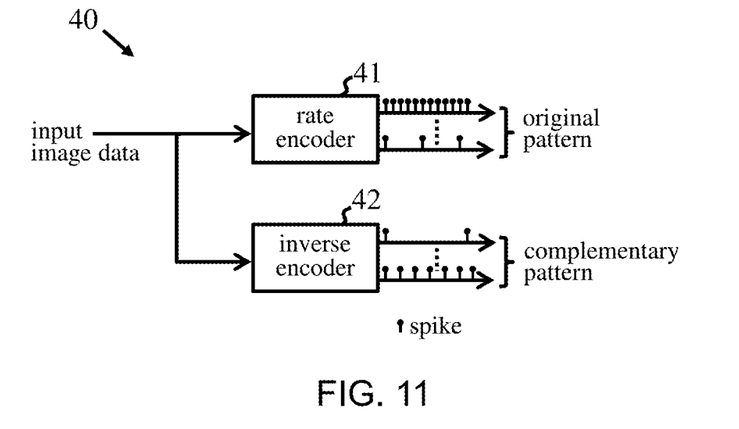
FIG. 11 shows another embodiment of a preprocessor unit of apparatus embodying the invention.

In a modification to the above embodiments, preprocessor unit 2 may produce the first set of input spike signals by encoding the original input data via an encoding scheme as before, but produce the second set of input spike signals by encoding the original input data via the inverse encoding scheme. Such a preprocessor 40, comprising a rate encoder 41 and inverse rate encoder 42, is illustrated in FIG. 11. Inverse rate encoder 42 simply inverts the rate encoding operation of encoder 41, i.e. encodes each pixel value p at the spike rate corresponding to its complementary pixel value p'.

Figure 12:
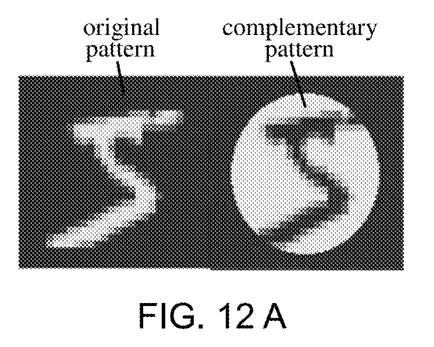
FIGS. 12A and 12B illustrate alternative methods for generating complementary patterns in embodiments of the invention.
Figure 12B:
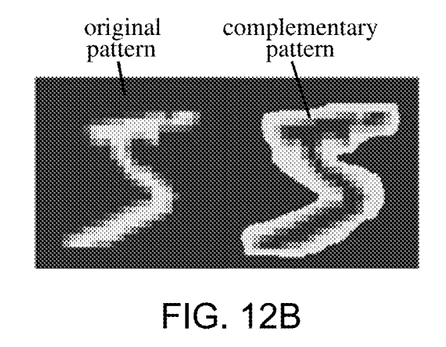

In alternative embodiments, preprocessor unit 2 may adapted such that the second set of input spike signals comprises signals encoding complementary values for a predetermined subset of the data points in the original pattern. For example, complementary data may be generated for only a predetermined portion, such as central window, of an input image as illustrated schematically in FIG. 12A. Alternatively, the complementary data may be generated for a subset of data points which is dependent on the original pattern, e.g. determined based on an active region of the pattern. In particular, the preprocessor unit may be adapted to identify active data points from the input data, and to produce the second set of input spike signals to comprise signals encoding complementary values for data points in a portion of the pattern containing the active data points. An example is illustrated schematically in FIG. 12B. Here, the preprocessor produces complementary image data for a region of the image surrounding and including the active pixels, e.g. pixels with data values greater than a predetermined threshold defining an active pixel. This can be achieved by straightforward modification of preprocessor 2. For example, the preprocessor may be adapted to identify active image pixels by comparing pixel values to the threshold, and then to select a region containing the active pixels for generation of the complementary data. Alternatively, for example, the complementary image data could be generated by effectively shifting the original image in one or more directions and subtracting the original image. These embodiments offer reduced power consumption as well as more balanced spike contribution of the active and inactive inputs.

Where complementary data is produced for only a portion of the original pattern, the number of input neurons and synapses for processing the second, complementary set of spike signals may be reduced accordingly. Alternatively, the same number of input neurons/synapse may be used for both spike sets, and the complementary pattern can be "completed" using the same data points as the original pattern, e.g. for the dark areas surrounding the complementary patterns in FIGS. 12A and 12B.

Various other changes and modifications can of course be made to the exemplary embodiments described. For example, the pre-processor may generate the spike patterns using other encoding schemes, such as spike correlation encoding. In this case, the data value for each data point is represented by a binary spike train with a spike representing a "1" and no spike representing a "0". The complementary input spike trains then represent the binary complement of the data point values.

While an image classification application has been described, in general any pattern of data points may be processed by the apparatus, and any type of correlation detection operation may be performed for pattern analysis. Data points may comprise any defined items or units of information and a pattern may comprise any structured set in which data points have a defined order, arrangement, assignment or other organization. By way of example, data points may comprise items of information in a document or data structure, signals from an apparatus, e.g. a sensor array, entries in a record such as a medical record, and so on.

In general, complementary values for data points may be defined in various ways according to the particular application and the nature of input patterns. For color images, for instance, RGB (red/green/blue) components may be split into separate channels, e.g. based on HSV (hue, saturation, value) or HSI (hue, saturation, intensity) schemes, which are processed individually as a greyscale. In general, complementary values may be defined in any convenient manner so as to represent some type of inverse or opposite value for a given data point.

Neurons of the SNN may in general learn entire data patterns or independent component patterns of a composite pattern. The SNN of some embodiments may be a component part of a larger, more complex SNN such that the output neurons $n_j$ are connected to other neurons of the larger network, e.g. via additional synapses. Here the output of the component SNN of the apparatus provides information on features or aspects of a pattern which may be further processed in the larger network. In this case, post-processing operations may be performed for outputs of the network as a whole.

Application-specific embodiments may be envisaged in which the apparatus is provided post-learning, with synaptic weights pre-adjusted, for use in the application mode only.

The complementary pattern approach is independent of the particular implementation of neurons and synapses. Other STDP schemes may be employed to adjust synaptic weight in dependence on (absolute or relative) timing of at least one of input neuron and output neuron spikes, and weight update schemes may be based on other variables/events in SNN operation, e.g. neuron membrane potentials and/or the output of neural network optimization techniques such as backpropagation of errors. Synaptic devices may be based on other memristive devices, e.g. other resistive memory cells such as resistive RAM (RRAM, or ReRAM) cells including conductive bridge RRAM cells, oxide or metal-oxide RRAM cells, and carbon RRAM cells. Neurons and synaptic devices may be implemented by CMOS circuits in some embodiments, and synapses may include a plurality of synaptic devices, e.g. in a multi-cell arrangement for increased dynamic range, or with two memory cells in a differential configuration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
  a spiking neural network comprising a set of input spiking neurons each connected to each of a set of output spiking neurons via a respective synapse for storing a synaptic weight which is adjusted for that synapse in dependence on network operation in a learning mode of the apparatus, each synapse being operable, in response to receipt of a spike from a respective input neuron for each synapse, to provide a post-synaptic signal, dependent on said weight, to a respective output neuron for each synapse; and
  a preprocessor adapted to:
  process input data, defining a pattern of data points;
  produce a first set of input spike signals which encode values representing respective data points, select a subset of the data points based on a result of comparing pixel values of the input data to a preset threshold, and produce a second set of input spike signals which encode values complementary to respective said values representing a selected subset of the data points, before supplying the first set and the second set of input spike signals to the spiking neural network,
  wherein the preprocessor is configured to generate, using a data inverter, the values complementary to respective said values representing the selected subset of the data points in the pattern; and
  supply the first set and the second set of input spike signals, as an input, to respective predetermined input neurons of the spiking neural network.

2. The apparatus according to claim 1, wherein the apparatus is operable in said learning mode and an application mode,
  wherein said learning mode, the preprocessor is operable to process at least one set of training data, defining a training pattern of data points, to produce said first and second sets of input spike signals for the training pattern and to supply the input spike signals to respective input neurons of the network in accordance with a predetermined mapping, and the network is adapted such that the synaptic weights of respective synapses are adjusted in dependence on network operation in response to the input spike signals in the learning mode, and
  wherein said application mode, the preprocessor is operable to process application data, defining an application pattern of data points, to produce said first and second sets of input spike signals for the application pattern and to supply the input spike signals to respective input neurons of the network in accordance with said predetermined mapping, and the network is adapted such that the synaptic weights of the synapses remain as adjusted in the learning mode.

3. The apparatus according to claim 2, wherein in the learning mode, the network is adapted such that the synaptic weight of each synapse is adjusted in dependence on timing of at least one of spikes produced by the input neuron of that synapse and spikes produced by the output neuron of that synapse.

4. The apparatus according to claim 3, wherein in the learning mode, the synaptic weight of each synapse is adjusted in dependence on relative timing of spikes produced by the input and output neurons of that synapse.

5. The apparatus according to claim 2, comprising:
  a postprocessor connected to the output neurons of the network and adapted to classify said pattern of data points in dependence on spikes produced by the output neurons in response to said input spike signals in the application mode.

6. The apparatus according to claim 2, wherein each synapse comprises at least one memristive device for storing said synaptic weight.

7. The apparatus according to claim 6, wherein said memristive device comprises a phase-change memory cell.

8. The apparatus according to claim 1, wherein the preprocessor is adapted such that the second set of input spike signals comprises signals encoding complementary values for all of the data points.

9. The apparatus according to claim 1, wherein the preprocessor is adapted such that the second set of input spike signals comprises signals encoding complementary values for a predetermined subset of the data points.

10. An apparatus, comprising:
  a spiking neural network comprising a set of input spiking neurons each connected to each of a set of output spiking neurons via a respective synapse for storing a synaptic weight which is adjusted for that synapse in dependence on network operation in a learning mode of the apparatus, each synapse being operable, in response to receipt of a spike from a respective input neuron for each synapse, to provide a post-synaptic signal, dependent on said weight, to a respective output neuron for each synapse; and
  a preprocessor adapted to:
  process input data, defining a pattern of data points;
  produce a first set of input spike signals which encode values representing respective data points, select a subset of the data points based on a result of comparing pixel values of the input data to a preset threshold, and produce a second set of input spike signals which encode values complementary to respective said values representing data points, before supplying the first set and the second set of input spike signals to the spiking neural network; and supply the first set and the second set of input spike signals, as an input, to respective predetermined input neurons of the spiking neural network, wherein the preprocessor is further adapted to identify active data points from said input data by comparing pixel values of said input data to a preset threshold and selecting a subset of the pattern using a result of the comparing, and to produce the second set of input spike signals to comprise signals encoding complementary values for data points in the selected subset of the pattern containing said active data points being identified.

11. The apparatus according to claim 1, wherein the preprocessor is adapted to produce the first set of input spike signals by encoding the input data corresponding to respective data points via a predetermined encoding scheme, and to produce the second set of input spike signals by producing data complementary to the input data corresponding to respective data points, and encoding the complementary data via said predetermined encoding scheme.

12. The apparatus according to claim 1, wherein the preprocessor is adapted to produce the first set of input spike signals by encoding the input data corresponding to respective data points via a predetermined encoding scheme, and to produce the second set of input spike signals by encoding the input data corresponding to respective data points via the inverse of said predetermined encoding scheme.

13. The apparatus according to claim 1, wherein the preprocessor is adapted to produce the input spike signals using a rate encoding scheme.

14. The apparatus according to claim 1, wherein the preprocessor is adapted to produce the input spike signals using a spike correlation encoding scheme.

15. The apparatus according to claim 1, comprising:
a postprocessor connected to the output neurons of the network and adapted to classify said pattern of data points in dependence on spikes produced by the output neurons in response to said input spike signals.

16. The apparatus according to claim 1, wherein each synapse comprises at least one memristive device for storing said synaptic weight.

17. The apparatus according to claim 16, wherein said memristive device comprises a phase-change memory cell.

18. The apparatus according to claim 1, wherein said pattern of data points comprises an image and said input data comprises image data.

19. The apparatus according to claim 1,
wherein the preprocessor is further adapted to identify active data points from said input data, and to produce the second set of input spike signals to comprise signals encoding complementary values for the data points in the selected subset of the pattern containing said active data points.

* * * * *